(12) United States Patent
Barfoot

(10) Patent No.: US 9,091,155 B2
(45) Date of Patent: Jul. 28, 2015

(54) REDUCING DISTURBANCE DURING FIBER OPTIC SENSING

(71) Applicant: Halliburton Energy Services, Inc., Houston, TX (US)

(72) Inventor: David Andrew Barfoot, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 96 days.

(21) Appl. No.: 13/938,496

(22) Filed: Jul. 10, 2013

(65) Prior Publication Data

US 2015/0014521 A1    Jan. 15, 2015

(51) Int. Cl.
*E21B 47/12* (2012.01)
*G01V 5/04* (2006.01)
*G01V 1/52* (2006.01)

(52) U.S. Cl.
CPC ............... *E21B 47/123* (2013.01); *G01V 1/52* (2013.01); *G01V 5/04* (2013.01)

(58) Field of Classification Search
CPC ........... G01V 5/04; G01V 1/52; E21B 47/123
See application file for complete search history.

(56) References Cited

U.S. PATENT DOCUMENTS

| | | | | |
|---|---|---|---|---|
| 4,589,285 A | * | 5/1986 | Savit | 73/655 |
| 2005/0088660 A1 | * | 4/2005 | Ronnekleiv | 356/478 |
| 2011/0286704 A1 | * | 11/2011 | Rubinstein et al. | 385/99 |
| 2012/0273270 A1 | * | 11/2012 | Rasheed | 175/24 |
| 2013/0021615 A1 | * | 1/2013 | Duncan et al. | 356/477 |
| 2013/0093598 A1 | * | 4/2013 | Duncan et al. | 340/854.7 |
| 2013/0094011 A1 | * | 4/2013 | Barry et al. | 356/4.01 |

FOREIGN PATENT DOCUMENTS

EP    1 496 723 B1    1/2005

OTHER PUBLICATIONS

J. A. Bucaro, "Optical fiber sensor coatings," Proceedings of the NATO Advanced Study Institute on Optical Fiber Sensors, 1987, pp. 321-338, 18 pages.

Blin, S., et. al., "Pickup Suppression in Sagnac-Based Fiber-Optic Acoustic Sensor Array," Journal of Lightwave Technology, vol. 24, No. 7, Jul. 2006, pp. 2889-2897, 9 pages.

(Continued)

*Primary Examiner* — David Porta
*Assistant Examiner* — Mindy Vu
(74) *Attorney, Agent, or Firm* — John W. Wustenberg; Fish & Richardson P.C.

(57) ABSTRACT

Reducing disturbance during fiber optic sensing. An in-well fiber optic sensing system includes a device insulated to be disturbance-resistant. The device is in a fiber optic communication path between a source and a target configured to be received in a well. The device is configured to receive a parameter sensing signal transmitted from the source to the target and produce a reference signal. The fiber optic sensing system includes a signal interrogation system connected to the device in the fiber optic communication path. The signal interrogation system is configured to receive the reference signal from the device and to receive a response signal from the target in response to the parameter sensing signal. The response signal represents the parameter of interest. The signal interrogation system is configured to determine the parameter of interest based, in part, on the reference signal and the response signal.

20 Claims, 5 Drawing Sheets

(56) References Cited

OTHER PUBLICATIONS

Posey, R. Jr., et al., "Strain sensing based on coherent Rayleigh scattering in an optical fibre", Electronics Letters, Sep. 28, 2000, vol. 36, No. 20, 2 pages.

Blin, Stephane, et al., "Pickup suppression in Sagnac-based fiber-optic acoustic sensor array," Proc. SPIE 6004, Fiber Optic Sensor Technology and Applications IV, 600407, Nov. 10, 2005, [Abstract], 3 pages.

Taylor, Henry F., "Fiber Fabry-Perot Sensor Configurations," Fiber Optic Sensors, 2nd Edition by Shizhuo Yin, et al., 2008, pp. 38-41, 2 pages.

Ghatak, Ajoy, et al., "Optical Waveguides and Fibers," Fundamentals of Photonics, University of Connecticut, 2000, 44 pages.

PCT International Search Report and Written Opinion of the International Searching Authority, PCT/US2014/042909, Mar. 30, 2015, 17 pages.

* cited by examiner

REDUCING DISTURBANCE DURING FIBER OPTIC SENSING

TECHNICAL FIELD

This disclosure relates to fiber optic systems used, for example, in wellbores.

BACKGROUND

Fiber optic cables are used to transmit light in fiber-optic communications and optical sensing. For example, in optical sensing, properties of light including its amplitude, phase, and frequency or some combination of those properties can represent various signal types, such as temperature, pressure, strain, acceleration, and the like. In some applications, optical sensing can be used in a wellbore by communicating light between a source and downhole sensors or actuators (or both) along a fiber optic communication path. Fiber optic sensing systems implemented in wellbores can include, e.g., fiber optic cables embedded in or attached to the wellbore's casing (or both), or run down into the wellbore with a well tool (e.g., a logging tool string in a drill pipe string). Fiber optic sensors, that sense parameters of interest in a wellbore can be interrogated by an above-ground instrument that includes optical components such as an optical source and an optical receiver. The optical sensor interrogation systems may be positioned such that they are exposed to disturbances including, e.g., acoustic and vibrational disturbances, caused by multiple sources. Due to the design of most optical sensing methods, these disturbances do not significantly affect the sensor parameter information contained in the light signal as it travels along a fiber optic sensing cable. However, as the light travels within the interrogation system on the surface, disturbances to the sensitive optical circuits within the interrogator can result in distortions to the sensor parameter information contained within the light signal.

BRIEF DESCRIPTION OF THE DRAWINGS

Like reference numbers and designations in the various drawings indicate like elements.

DETAILED DESCRIPTION

Figure 1:
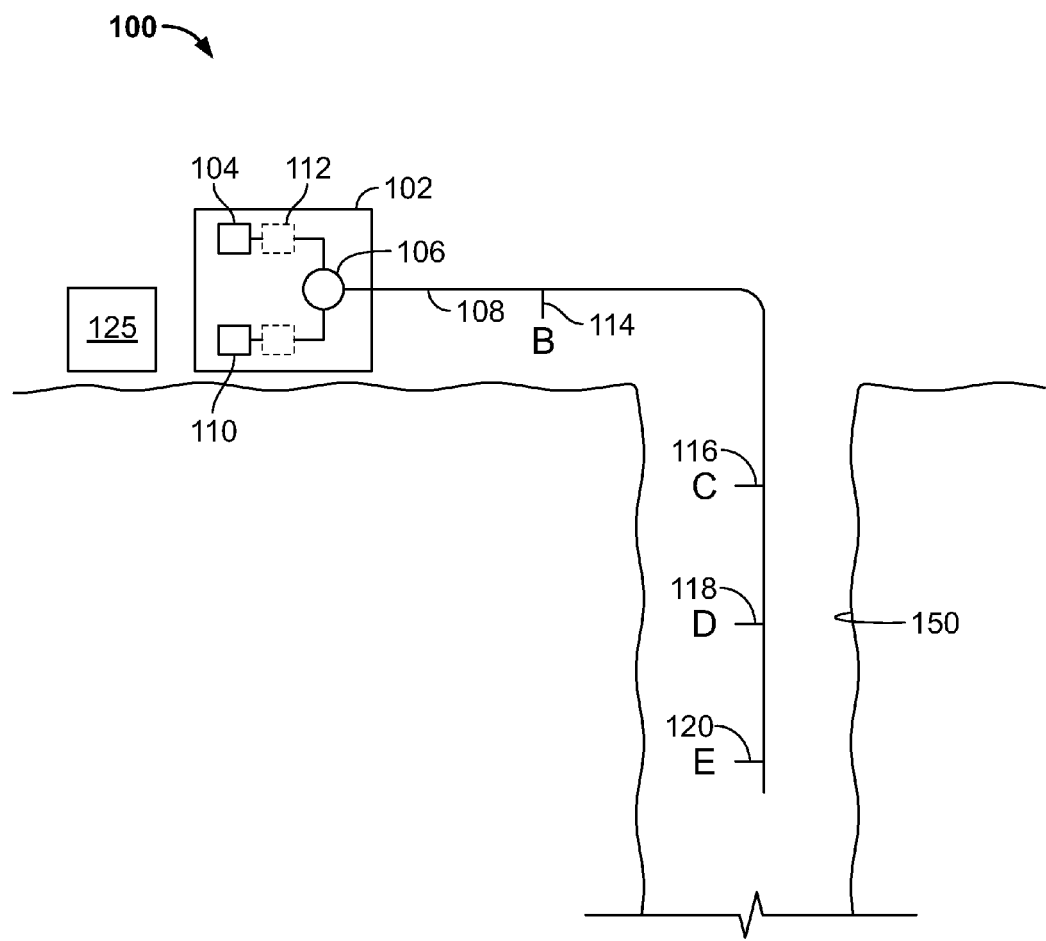
FIG. 1 illustrates an example system for reducing disturbance during in-well fiber optic sensing.

This disclosure relates to reducing disturbance during fiber optic sensing. The techniques described here can be implemented to minimize disturbances, e.g., acoustic disturbances such as background noise, vibrational disturbances or other disturbances, of signals acquired by fiber optic sensing systems using fiber optic distributed acoustic or vibration sensing from sensors disposed in wellbores. Such fiber optic sensing systems are exposed to several disturbances based, in part, due to locations in which the sensor interrogation system is located, e.g., adjacent to equipment (e.g., well equipment) that generate noise (or combinations of them). The fiber optic cables that carry light signals to the sensing locations and the equipment used to interrogate the light signals are also similarly exposed to disturbances. For example, when the fiber optic sensing system is implemented at a wellbore, a generator can be positioned near the fiber optic sensing system. The generator can generate an acoustic disturbance which can affect a signal interrogation system that interrogates light signals that carry parameters of interest sensed at sensing locations that are inside and outside the wellbore. As an alternative or in addition to wellbore implementations, the techniques described here can be implemented in non-well environments, e.g., for pipeline leak detection, perimeter security monitoring, surface seismic sensing, and other similar non-well environments.

Example disturbances can include noise from electrical noise sources, e.g., Johnson noise, shot noise, power supply ripple noise, electromagnetic interference (EMI), digital quantization noise, and non-linearity in amplifiers and in analog-to-digital converters. In the case of fiber optic sensors, in addition to these electrical noises, there are also optical noise sources. Sources of disturbance can include the light source (e.g., a laser), due to fluctuations in the power level, polarization, light coherence, optical wavelength, or other similar disturbances. Also, the various components (e.g., optical components) within the fiber optic sensing system, e.g., optical amplifiers, couplers, filters, splices, receivers, fiber optic cable signal paths, and other similar components, can all potentially be exposed to disturbances that affect a light signal containing information about a parameter of interest sensed by a sensor.

A disturbance to a fiber optic sensor interrogation system may produce a distortion to the light signal that results in the same distortion to the information across all sensing locations along the fiber optic cable of a fiber optic sensing system. This "common-mode" disturbance can result due to the disturbances described above or other disturbances (or combinations of them). This disclosure describes techniques to characterize and minimize such a common-mode disturbance. Minimizing the common-mode disturbance can include characterizing the common-mode disturbance and subtracting it from the sensing signal such that the remaining common-mode disturbance present in the sensing signal is below an acceptable threshold.

Minimizing the common-mode disturbance can be implemented without an electrical power source, permitting the components of the disturbance minimizing system to be positioned at any convenient location. Because the common-mode disturbance can be minimized, optical sensing techniques or signals that contribute to the common-mode disturbance can nevertheless be used. The techniques described here can be implemented in real-time, i.e., without substantial delay after a signal affected by the common-mode disturbance is sensed. Relative to complex signal processing techniques that can be implemented to remove the common-mode disturbance, the techniques described here are simpler, more reliable, and lower in cost.

The techniques to minimize the common-mode disturbance can be implemented with few to no design constraints. For example, compensator devices in either Mach-Zehnder or Michelson configuration are typically used as part of a multi-point or distributed interferometric fiber optic sensing system. However, such devices may be too sensitive to environmental disturbances to be operated in close proximity to convection cooling fans and therefore may include passively cooled low power components within the interrogation system. In contrast, the techniques described here can be implemented and allow use of higher power-operated components that implement active cooling from low volume fans within the interrogation system with acceptable levels of degradation of the acquired signal.

Components of the fiber optic sensing system to minimize the common-mode noise can occupy a small physical area and can be positioned almost anywhere in the environment in which the fiber optic sensing system is implemented. For example, in wellbore implementations (e.g., wellbore profiling, drilling, production, hydraulic fracturing, seismic sensing operations, and the like), the components of the fiber optic sensing system can be disposed in locations that experience large quantities of noise. Using such equipment, the common-mode disturbance can be minimized to minimize signal corruption.

Example techniques are described with reference to a wellbore. In general, the techniques can be applied to coherent Rayleigh backscatter distributed interferometric sensing methods in which multiple sensing locations are distributed along a length of a fiber optic cable. The techniques can also be applied in situations in which a continuous length of fiber optic cable with intrinsic Rayleigh backscatter is used or in situations in which partial reflectors are inserted in series with a fiber optic cable that senses a parameter of interest, e.g., Fiber Bragg gratings, or other reflecting devices (or combinations of them).

Figure 2:
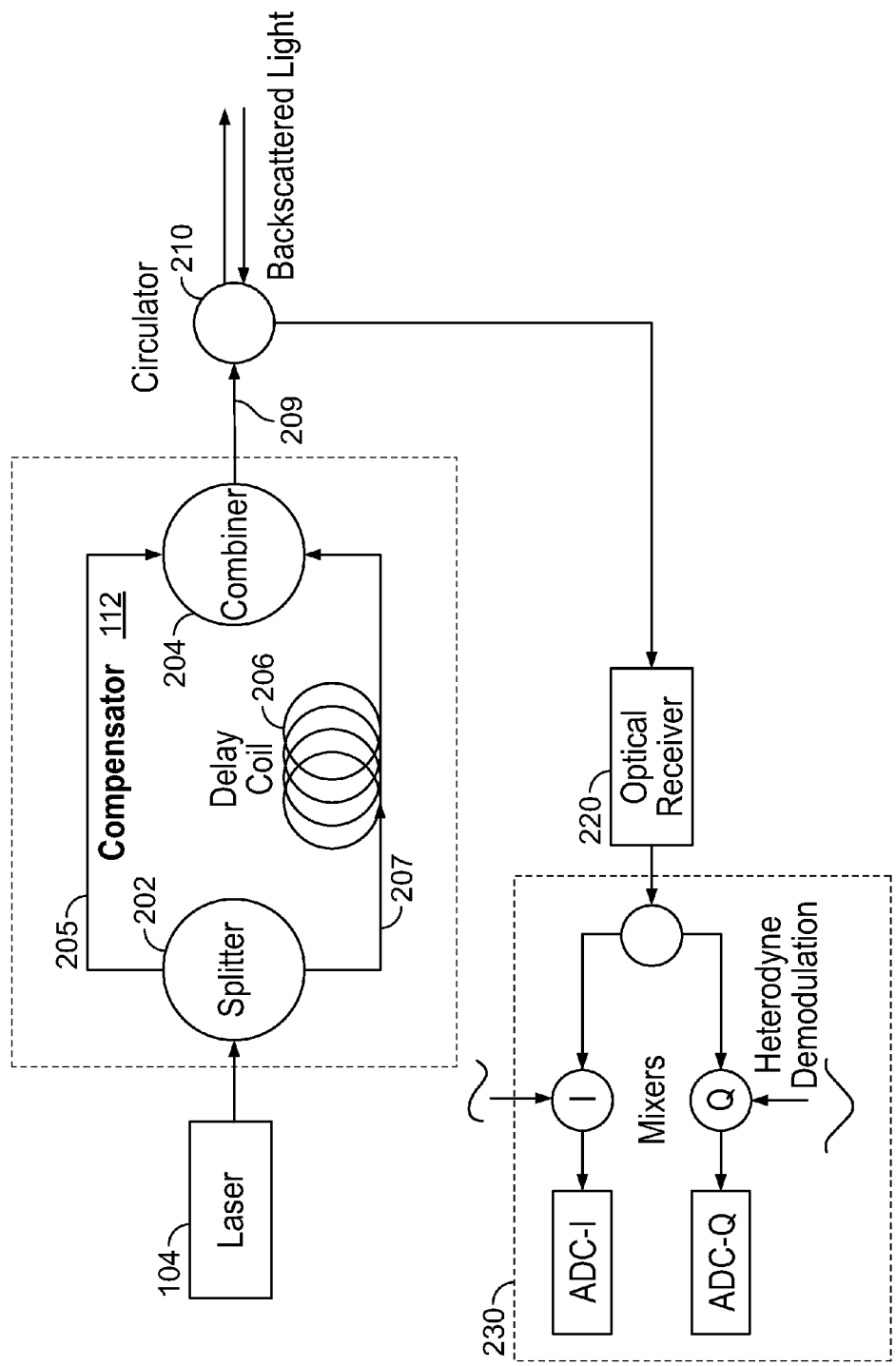
FIG. 2 illustrates an example compensator implemented in a fiber optic sensing system.

FIGS. 1 and 2 illustrate an example system for reducing disturbance during in-well fiber optic sensing. A well system 100 illustrated in FIG. 1 can include a fiber optic sensing system 102. For example, the fiber optic sensing system 102 can implement distributed acoustic sensing using backscattered coherent Rayleigh light. The fiber optic sensing system 102 includes a source 104. For example, the source can be a coherent light emitter such as a laser source. The light signal generated by the source 104 can be carried in a fiber optic communication path by a fiber optic cable 108 that extends from the fiber optic sensing system 102 disposed at or near a terranean surface to remote (e.g., downhole) locations of sensors in a well 150.

In some implementations, the fiber optic sensing system 102 is configured to interrogate the fiber optic cable 108 (and other fiber optic cables) that carry the light signals with the laser 102 such that the fiber optic cable 108 becomes a distributed interferometer. To do so, the fiber optic sensing system 102 includes a compensator 112 in the fiber optic communication path. As described with reference to FIG. 2, the compensator 112 is configured to split the parameter sensing signal from the source 104 into two light segments, each transmitted along the fiber optic communication path by the fiber optic cable 108 to a target (not shown) configured to be received in the well 150. The target can include one or more of multiple sensing locations along the fiber optic communication path, e.g., a first sensing location 114 at a terranean surface of the well system 100, a second sensing location 116, a third sensing location 118, a fourth sensing location 120, and other sensing locations). Each sensing location can be a position on the fiber optic cable 108.

The compensator 112 includes a splitter 202 that splits a single pulse of light (e.g., received from the source 104), into two light signals. Each of the two light signals is carried through a fiber optic cable 205 and a fiber optic cable 207, respectively. The fiber optic cable 205 can be shorter than the fiber optic cable 207. The compensator 112 includes a combiner 204 that receives the light signal traveling through the shorter path (i.e., the fiber optic cable 205) before receiving the light signal traveling through the longer path (i.e., the fiber optic cable 207). Splitting the light using the compensator 112 results in any disturbance (e.g., vibration, acoustic energy, or other disturbance) that is coupled onto the fiber optic cable in the compensator 112 presenting as a very similar disturbance at each sensing location along the fiber optic cable 108.

As the two light signals travel along the fiber optic cable 209 separated by a distance based on a difference in the lengths of the fiber optic cables 205 and 207, each generates separate backscattered light, e.g., in response to a parameter sensed by a sensor at a sensing location. In some implementations, the two light signals can travel through an optical circulator 210 that can unidirectionally transmit the light signals towards the target, and the backscattered light towards a signal interrogation system 110 described below.

The backscattered light that travels back to the optical circulator 210 and reaches the optical receiver 220 interferes with each other. The interference signal is based on the optical phase difference between the pulses and can be quantified through a demodulation method. The change over time of the resulting phase difference between the pulses is a measurement of vibration or acoustic energy on the fiber at specific sensing locations. The signal interrogation system 110 can multiplex the signals sensed at the multiple sensing locations using time domain multiplexing (TDM) such that the elapsed time from the time of the source 104 transmitting the pulse to the time of analog-to-digital converters recording a value determines a distance of a sensing location along the fiber optic cable 108. By recording values at a fast rate (e.g., 100 MHz or higher), the fiber optic cable 108 can be implemented as an array of several (e.g., hundreds or thousands) of acoustic and vibration sensors. In some implementations, the backscattered light can further be processed by a heterodyne demodulation unit 230.

If a fiber optic sensing system operated without any external disturbances other than those caused by the sources that generate parameters of interest being sensed at the sensing locations, the phase difference between the two light signals into which the compensator 112 splits the light signal from the source 104, as the two light signals leave the compensator 112, will not change for different light signals (e.g., light pulses) produced by the source 104. However, in reality, any disturbance, e.g., acoustic or vibrational or other type of disturbance, to which the compensator 112 is exposed, will change the optical phase difference of the two light signals. The change in phase will result in a subsequent change in phase to all sensing channels along the fiber optic cable and will manifest as an added phase change in addition to any disturbance-induced phase change to which a sensor is exposed. Sources of disturbance that can affect the compensator 112 can include environmental noise sources, e.g., from equipment used in the well system 100, disturbance from equipment used to cool the interrogator, generators, truck motors, air conditioners, opening and closing of doors, sounds from televisions/radio, and the like.

To minimize a disturbance that appears to be common across all sensing locations along the fiber optic cable 108, the fiber optic sensing system 102 includes a device 106 in the fiber optic communication path between the source 102 and the target. The device 106 is insulated to be disturbance-resistant (i.e., substantially free of disturbances external to the device). The device 106 is configured to receive a parameter sensing signal transmitted from the source to the target and to produce a reference signal. The device 106 can be installed outside the enclosure that includes the fiber optic sensing system 102 (FIG. 3A) or within the enclosure that includes the fiber optic sensing system 102 (FIG. 3B).

In some implementations, the device 106 includes a fiber optic cable ("reference fiber optic cable") disposed in disturbance-dampening gel configured to insulate the fiber optic cable from any external disturbances. Alternatively or in addition, the reference fiber optic cable can be disposed in any disturbance-isolated environment and may additionally include fiber coatings to de-sensitize the reference fiber optic cable to disturbances, e.g., acoustic disturbances. In some implementations, the disturbance-isolated environment can include potting material (wax, epoxy, or other suitable potting material) in an enclosure that additionally can include acoustic foam, elastomers, metal coated fiber, or other disturbance-isolating materials. For example, the device 106 can include a metal disc 340 (FIGS. 3A, 3B) in which the reference fiber optic cable 342 FIGS. 3A, 3B) is disposed for disturbance dampening. For example, the reference fiber optic cable 342 can include substantially 200 meters of SMF 28 fiber optic cable disposed and submerged in paraffin wax.

The reference fiber optic cable receives the parameter sensing signal from the source 104 and transmits the parameter sensing signal to a fiber optic cable 108 connected in-line with the reference fiber optic cable. The fiber optic cable 108 carries the light signal to multiple sensing locations along the fiber optic cable 108 (for example, a first sensing location 114 at a terranean surface of the well system 100, a second sensing location 116, a third sensing location 118, a fourth sensing location 120, and other sensing locations). In this manner, the reference fiber optic cable is interrogated in the same manner using the same light signals passed through the same fiber optic communication path as the portions of the fiber optic cable 108 at the specific sensing locations along the fiber 108.

The disturbance-resistant device 106 provides a control region with minimal disturbance. Any phase change measurements to the acoustic sensor channels within the device 106 will be due to noise induced into the parameter sensing signal from the signal interrogation system 110. The signal interrogation system 110 is configured to receive the reference signal from the device 106 and a response signal from the target in response to the parameter sensing signal. The response signal represents the parameter of interest. The signal interrogation system 102 is configured to determine the parameter of interest based, in part, on the reference signal and the response signal. For example, to determine the parameter of interest, the signal interrogation system 110 is configured to subtract the reference signal from the response signal.

For example, a disturbance source 125 (e.g., a power generator) can be positioned in sufficient proximity to the fiber optic sensing system 102 that a noise produced by the power generator affects the light signal produced and received by the fiber optic sensing system 102. For example, the disturbance source 125 produces a time varying acoustic noise represented by the function shown in Equation 1.

$$\text{Disturbance source noise} = DS(t) \qquad \text{(Equation 1)}$$

For example, if the power generator resonates primarily at 50 Hz, the acoustic noise can be represented by the function shown in Equation 2.

$$DS(t) = \sin(2 \cdot \pi \cdot 50 \cdot t) \qquad \text{(Equation 2)}$$

At the first sensing location 114 (B), the second sensing location 116 (C), the third sensing location 118 (D) and the fourth sensing location 120 (E), the time varying acoustic noises can be represented by functions B(t), C(t) D(t), and E(t), respectively. The first sensing location 114 (B) is on the terranean surface of the well system 100 and can experience disturbances (e.g., acoustic, vibrational, and other disturbances) from people, trucks, wind, and other sources. The second sensing location 116 (C), the third sensing location 118 (D) and the fourth sensing location 120 (E) are locations at different depths within the wellbore 150. The disturbances experienced at these sensing locations can be due to, e.g., fluid or gas flow, downhole too movement, and other sources.

Because the device 106 is not affected or is minimally affected by vibro-acoustic energy, the acoustic signal inside the reference fiber optic cable (RC(t)) is defined by the function shown in Equation 3.

$$RC(t) = 0 \qquad \text{(Equation 3)}$$

Disturbances to which the fiber optic cables included in the compensator 112 are reproduced as disturbance signals applied to all other channels of the signal interrogation system 110. This results in a difference between an actual disturbance sensed at a sensing location and an actual signal recorded by the signal interrogation system 110 for the sensing location. The time varying signal recorded by the signal interrogation system 110 for a sensing location is represented by S(location, t), where "location" represents a particular sensing location, e.g., the first sensing location 114 or the second sensing location 116.

The signal received by the signal interrogation system 110 can be attenuated and distorted by the enclosure around the compensator 112. The attenuation/distortion can be represented by the function, X(t). The functions shown in Equations 4-8 represent the actual data recorded by the signal interrogation system 110 (ignoring various random noise sources).

$$S(B,t) = B(t) + X(DS(t)) \qquad \text{(Equation 4)}$$

$$S(C,t) = C(t) + X(DS(t)) \qquad \text{(Equation 5)}$$

$$S(D,t) = D(t) + X(DS(t)) \qquad \text{(Equation 6)}$$

$$S(E,t) = E(t) + X(DS(t)) \qquad \text{(Equation 7)}$$

$$S(RC,t) = RC(t) + X(DS(t)) = 0 + X(DS(t)) = X(DS(t)) \qquad \text{(Equation 9)}$$

To minimize the common-mode noise experienced by the sensing locations, the signal interrogation system 110 is configured to subtract the signal recorded from the device 106 (i.e., DS(RC(t))), from the signal recorded from the sensing locations as shown below in Equations 9-12.

$$S(B,t) = B(t) + X(DS(t)) - S(RC,t) = B(t) - X(S(t)) = B(t) \qquad \text{(Equation 10)}$$

$$S(C,t) = C(t) + X(DS(t)) - S(RC,t) = C(t) - X(S(t)) = C(t) \qquad \text{(Equation 11)}$$

$$S(D,t) = D(t) + X(DS(t)) - S(RC,t) = D(t) - X(S(t)) = D(t) \qquad \text{(Equation 12)}$$

$$S(E,t) = E(t) + X(DS(t)) - S(RC,t) = E(t) - X(S(t)) = E(t) \qquad \text{(Equation 13)}$$

In distributed acoustic sensing implementations, the spacing between the sensing locations is based on how quickly the light signal is sampled in the signal interrogation system 110. In some implementations, a frequency of sampling can be sufficiently high so that each sensing location can be substantially one meter apart. Thus, for a lengthy fiber optic cable 108 (e.g., 5000 m long), a large quantity of sensing locations can be defined to serve as acoustic sensor channels. The spacing between sensing locations can be either further decreased or increased, e.g., by a multiplexing approach that is similar to that implemented in optical time domain reflectometry.

The techniques described here can be implemented during surface or downhole seismic operations, e.g., vertical seismic profiling (VSP). In VSP, a seismic source (vibrator truck, etc.) imparts a strong vibration signal into the ground. The distributed vibration fiber sensor deployed down a wellbore picks up the seismic signal as part of the VSP measurement. However, the sensor interrogator may also be impacted by the seismic energy produced by the vibration truck. The reference device may be used to subtract out the interference signal produced by the seismic energy that impacts the sensor interrogation system.

In some implementations, the techniques to minimize the common-mode noise described above with reference to distributed acoustic sensing can be implemented, alternatively, with Fabry-Perot acoustic/vibration sensors. The Fabry-Perot concept is to use two partial mirrors with a gap or distance in between. As the gap length changes due to disturbance (e.g., vibration), the optical interference obtained from mixing the reflected light signal from the two mirrors will change. Fabry-Perot sensors can be multiplexed using various techniques including time-domain and wavelength-division methods. The Fabry-Perot sensors can be intrinsic or extrinsic. In implementations of intrinsic or extrinsic Fabry-Perot sensing, the device 106 can be a disturbance-resistant Fabry-Perot sensor that has been de-sensitized to disturbances. In such implementations, the sensing locations can be positioned at the locations of the Bragg gratings or mirrors. In such implementations, the sensing locations can be spaced apart, e.g., by 10 m.

In some implementations, the device 106 can be maintained at a constant temperature. Temperature changes can cause a slow change to the strain on the reference fiber optic cable due to thermal expansion resulting in a change in an optical phase on a section of reference fiber optic cable. By controlling the temperature of the reference fiber optic cable, the reference fiber optic cable could be used to subtract out the effects of slow thermal drift of the compensator 112. The temperature could be passively damped by thermal insulation/mass, or also actively controlled by a resistive heater, and/or thermo-electric (Peltier) cooler. Thermally controlling the reference fiber optic cable instead of the compensator 112 can enable decreasing a size of the device 106 relative to the compensator 112 and keeping the device 106 away from heat sources, e.g., power supplies or other similar heat sources.

In some implementations, the reference fiber optical cable can be of sufficient to serve as multiple sensor channels, each of which can produce a respective reference signal in response to receiving the parameter sensing signal. In some implementations, multiple disturbance-resistant devices can be disposed in the fiber optic communication path in-line with the device 106, each to receive the parameter sensing signal and responsively produce a respective reference signal. The signal interrogation system 110 is configured to receive the multiple reference signals produced by either of the techniques described above. The signal interrogation system 110 can generate a combined reference signal from the multiple reference signals. The combined reference signal represents a high fidelity signal that contains primarily the common-mode disturbance and very little channel-specific random disturbance. To generate the combined reference signal, the signal interrogation system 110 can coherently stack (add) the multiple reference signals to increase a signal-to-noise ratio of the combined reference signal relative to each of the multiple reference signals. In some implementations, each reference signal may be multiplied by a weighting factor before coherently stacking based on the signal-to-noise ratio of the individual reference signal such that higher quality reference signals receive a larger weighting factor. Alternatively, or in addition, the signal interrogation system 110 can select a reference signal with the highest signal-to-noise ratio as the combined reference signal.

The signal interrogation system 110 can subtract the combined reference signal from the response signal. The signal interrogation system 110 can obtain a response signal from each of the multiple sensing locations along the fiber optic cable 108 (for example, the first sensing location 114 at a terranean surface of the well system 100, the second sensing location 116, the third sensing location 118, the fourth sensing location 120, and other sensing locations). In some implementations, the signal interrogation system 110 can coherently subtract the common-mode reference signal from the response signals obtained from the multiple sensing locations. By doing so, the signal interrogation system 110 can minimize the common-mode disturbance from the response signals received from the multiple sensing locations.

Figure 3A:
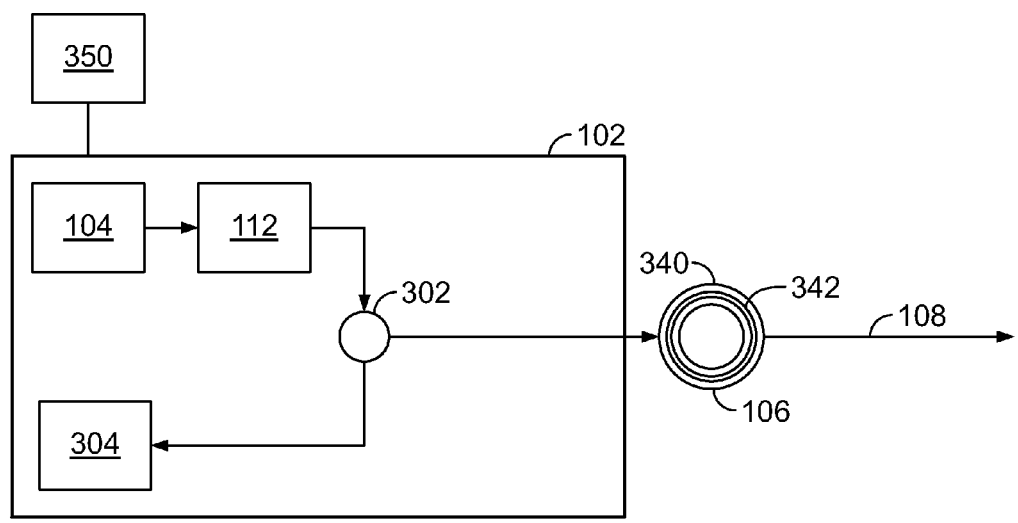
FIGS. 3A and 3B illustrate example configurations of fiber optic sensing systems that include compensators.
Figure 3B:
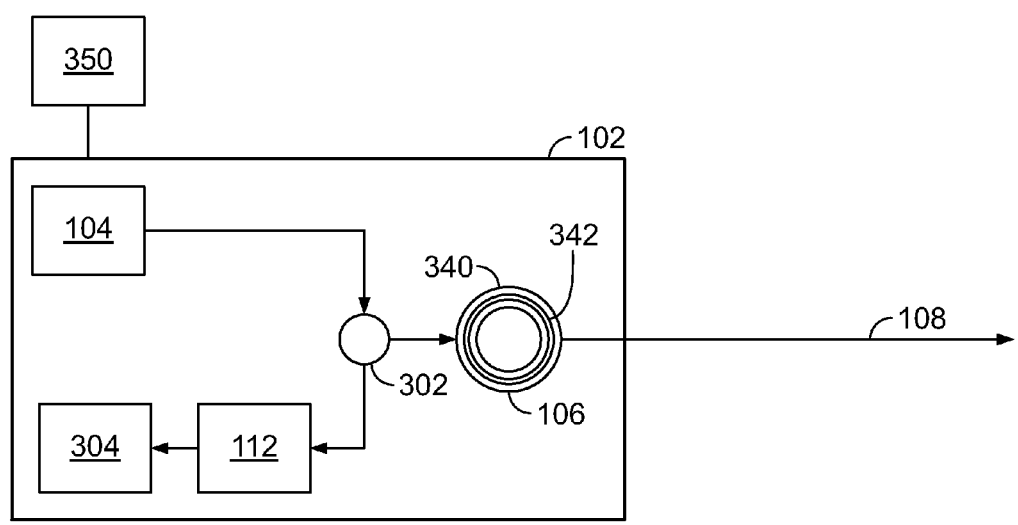

FIGS. 3A and 3B illustrate example configurations of fiber optic sensing systems that include compensators. In some implementations, the compensator 112 can be placed on the optical launch side of the fiber optic communication path (FIG. 3A). For example, the source 104 can generate and transmit a light signal to the compensator 112 through a fiber optic cable. The compensator 112 can split and recombine the light signal as described above, and transmit the light signal to an optical circulator 302. The optical circulator 302 can unidirectionally transmit the light signal to the disturbance-resistant device 106, which, in turn, can transmit the light signal to the target. The disturbance-resistant device 106 can receive the backscattered light signal from the target and transmit the backscattered light signal to the optical circulator 302. An optical receiver 304, e.g., included in the signal interrogation system 102, can receive the backscattered light signal from the optical circulator 302. In some implementations, the compensator 112 can be placed on the receiver side of the fiber optic communication path (FIG. 3B), in which the light signal from the target is transmitted through the compensator 112 before being received by the optical receiver 304. Example compensators include Michelson compensators and Mach-Zehnder compensators. The fiber optic sensing system 102 can include additional components, e.g., erbium-doped fiber amplifiers (EDFA), pulse generators, couplers, and the like (not shown).

Figure 4:
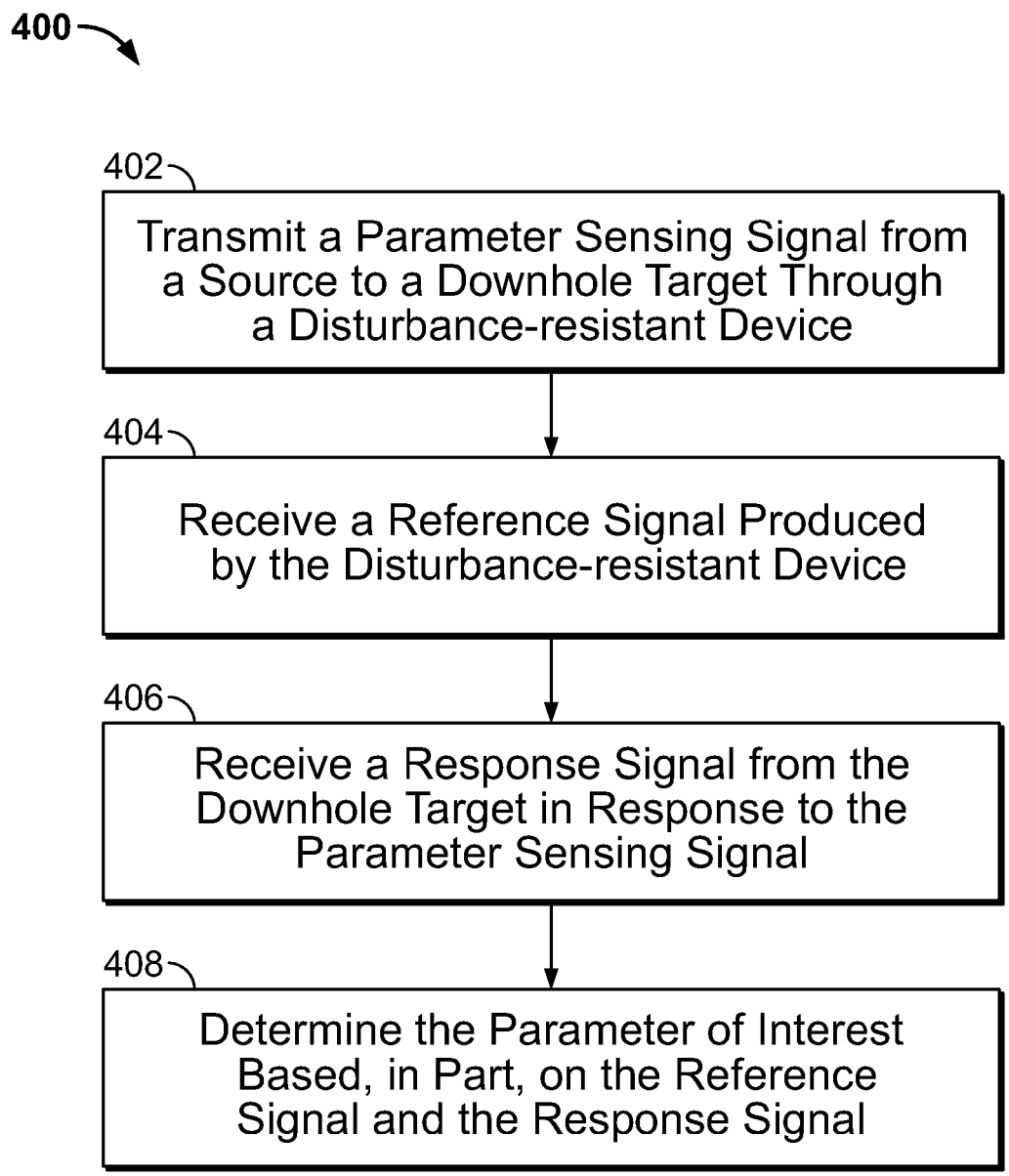
FIG. 4 is a flowchart of an example process for reducing disturbance during in-well fiber optic sensing.

In some implementations, the fiber optic sensing system 102 can include or be connected to a computer system 350 that is configured to implement the techniques described here to minimize the common-mode noise. The computer system 350 can include a computer-readable medium storing instructions executable by data processing apparatus to perform operations to minimize the common-mode noise. Alternatively or in addition, the computer system 350 can be implemented as hardware, firmware or combinations of them. In some implementations, the computer system 350 can implement a process 400 (FIG. 4) to minimize the common-mode noise.

Figure 5:
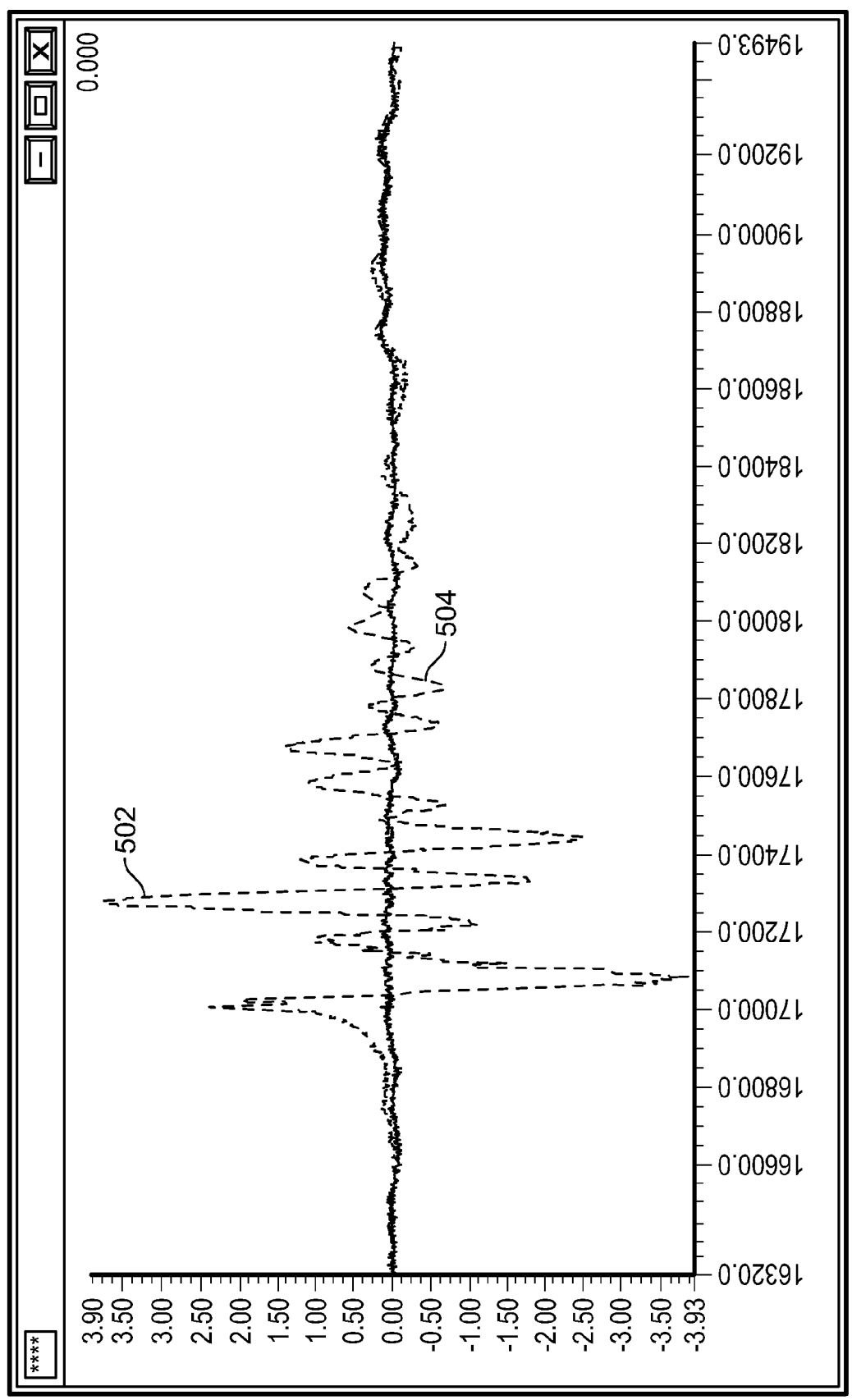
FIG. 5 is a plot showing a signal from which a common-mode noise has been subtracted.

At 402, the computer system 350 transmits a parameter sensing signal from a source to a downhole target through a disturbance-resistant device to measure a parameter of interest at the downhole target. At 404, the computer system 350 receives a reference signal produced by the disturbance-resistant device. At 406, the computer system 350 receives a response signal from the downhole target in response to the parameter sensing signal. At 404, the computer system 350 determines the parameter of interest based, in part, on the reference signal and the response signal. For example, the computer system 350 subtracts the reference signal from the response signal. FIG. 5 shows a first signal 502 measured by introducing disturbance into the signal interrogation system 110. By implementing the techniques described above and with reference to FIG. 4, the common-mode noise in the first signal 502 was minimized resulting in a second signal 504. In some situations, noise reduction of greater than 20 dB (more than 10× decrease) can be achieved by implementing the techniques described here.

A number of implementations have been described. Nevertheless, it will be understood that various modifications may be made without departing from the spirit and scope of the disclosure.

The invention claimed is:

1. A system for reducing disturbance during in-well fiber optic sensing, the system comprising:
a device insulated to be disturbance-resistant, the device in a fiber optic communication path between a source and a target configured to be received in a well, the device configured to receive a parameter sensing signal transmitted from the source to the target, the device configured to produce a reference signal, wherein the device includes a first fiber optic cable to receive the parameter sensing signal from the source, the first fiber optic cable disposed in disturbance dampening gel;
a second fiber optic cable connected in-line with the first fiber optic cable, the second fiber optic cable to transmit the parameter sensing signal to the target; and
a signal interrogation system connected to the device in the fiber optic communication path, the signal interrogation system configured to:
receive the reference signal from the device;
receive a response signal from the target in response to the parameter sensing signal, the response signal representing the parameter of interest, and
determine the parameter of interest based, in part, on the reference signal and the response signal.

2. The system of claim 1, wherein the reference signal is substantially free of disturbances external to the device.

3. The system of claim 1, to determine the parameter of interest, the signal interrogation system is configured to subtract the reference signal from the response signal.

4. The system of claim 1, wherein the device includes either an intrinsic or extrinsic Fabry-Perot sensor.

5. The system of claim 1, wherein the device is included in a plurality of disturbance-resistant devices in the fiber optic communication path in-line with the device, each disturbance-resistant device configured to receive the parameter sensing signal and responsively to produce a respective reference signal, the signal interrogation system configured to:
receive a plurality of reference signals produced by the plurality of disturbance-resistant devices;
generate a combined reference signal from the plurality of reference signals produced by the plurality of disturbance-resistant devices
subtract the combined reference signal from the response signal.

6. The system of claim 5, wherein generating the combined reference signal from the plurality of reference signals comprises coherently stacking the plurality of reference signals to increase a signal-to-noise ratio of the combined reference signal relative to each of the plurality of reference signals.

7. The system of claim 1, wherein the signal interrogation system further comprises a compensator included in the fiber optic communication path, the compensator configured to split the parameter sensing signal into a first light segment and a second light segment, the source configured to transmit the first light segment and the second light segment along the fiber optic communication path to the target.

8. The system of claim 1, further comprising an optical circulator configured to unidirectionally transmit the parameter sensing signal to the target through the sensing device and to unidirectionally transmit the response signal to the signal interrogation system.

9. The system of claim 1, wherein the device transmits the parameter sensing signal from the source to a plurality of targets, each configured to be received in the well, the signal interrogation system to:
receive a respective plurality of response signals from the plurality of targets, each response signal representing a corresponding parameter of interest, and
subtract the reference from each response signal.

10. The system of claim 1, wherein the first fiber optic cable comprises fiber coatings configured to de-sensitize the first fiber optic cable to disturbances.

11. A method for reducing disturbance during in-well fiber optic sensing, the method comprising:
transmitting a parameter sensing signal from a source to a downhole target through a disturbance-resistant device to measure a parameter of interest at the downhole target, the disturbance-resistant device producing a reference signal that is substantially disturbance-free in response to receiving the parameter sensing signal, wherein transmitting the parameter sensing signal from the source to the downhole target comprises transmitting the parameter sensing signal through a first fiber optic cable connected to the disturbance-resistant device, wherein the disturbance-resistant device includes a second fiber optic cable, wherein the method further comprises disposing the second fiber optic cable in disturbance dampening gel;
receiving the reference signal produced by the disturbance-resistant device;
receiving a response signal from the downhole target in response to the parameter sensing signal, the response signal representing the parameter of interest; and
subtracting the reference signal from the response signal.

12. The method of claim 11, wherein transmitting the parameter sensing signal to the target through the disturbance-resistant device comprises transmitting the parameter sensing signal through either an intrinsic or extrinsic Fabry-Perot sensor.

13. The method of claim 11, wherein the disturbance-resistant device is included in a plurality of disturbance-resistant devices, and wherein the method further comprises:
transmitting the parameter sensing signal through the plurality of disturbance-resistant devices, each disturbance-resistant device producing a respective reference signal that is substantially disturbance-free in response to receiving the parameter sensing signal;
receiving a plurality of reference signals produced by the plurality of disturbance-resistant devices;
generate a combined reference signal from the plurality of reference signals; and
subtracting the combined reference signal from the response signal.

14. The method of claim 11, further comprising splitting the parameter sensing signal into a first light segment and a second light segment before transmitting the first light signal to the disturbance-resistant device.

15. The method of claim 14, further comprising splitting the response signal into a first light segment and a second light segment before receiving the second light signal.

16. The method of claim 11, further comprising:
unidirectionally transmitting the parameter sensing signal to the target through the sensing device; and
unidirectionally transmitting the response signal from the target to receive the second light signal.

17. The method of claim 11, further comprising:
transmitting the parameter sensing signal from the source to a plurality of downhole targets to measure a respective plurality of parameters of interest;
receiving a respective plurality of response signals from the plurality of downhole targets, each response signal representing a corresponding parameter of interest; and
subtracting the reference signal from each response signal.

18. The method of claim 11, further comprising including, in the first fiber optic cable, fiber coatings configured to de-sensitize the first fiber optic cable from disturbances.

19. A system for reducing disturbance during in-well fiber optic sensing, the system comprising:
a disturbance-resistant device including a sensor to receive a parameter sensing signal from a source and to generate a reference signal responsive to the parameter sensing signal, the reference signal is substantially free of disturbances external to the disturbance-resistant device, the parameter sensing signal transmitted to a downhole target sensor through the disturbance-resistant device, wherein the device includes a first fiber optic cable to receive the parameter sensing signal from the source, the first fiber optic cable disposed in disturbance dampening gel;
a second fiber optic cable connected in-line with the first fiber optic cable, the second fiber optic cable to transmit the parameter sensing signal to the target;
a signal interrogation system connected to the disturbance-resistant device, the signal interrogation system to:
receive the reference signal from the disturbance-resistant device;
receive a response signal from the downhole target sensor in response to the parameter sensing signal, the response signal representing the parameter of interest; and
subtract the reference signal from the response signal.

20. The system of claim 19, wherein the disturbance-resistant device is included in a plurality of disturbance-resistant devices connected serially through which the parameter sensing signal is transmitted from the source to the downhole target sensor, each disturbance-resistant device receiving the parameter sensing signal and responsively producing a respective reference signal, the signal interrogation system to:
receive a plurality of reference signals produced by the plurality of disturbance-resistant devices;
generate a combined reference signal from the plurality of reference signals produced by the plurality of disturbance-resistant devices by coherently stacking the plurality of reference signals to increase a signal-to-noise ratio of the combined reference signal relative to each of the plurality of reference signals; and
subtracting the combined reference signal from the response signal.

* * * * *